United States Patent
Perry (10) Patent No.: US 7,614,395 B2
(45) Date of Patent: Nov. 10, 2009

(54) ELECTROFORMED THIN-WALL CUTTING SAW IMPREGNATED WITH ABRASIVES

(75) Inventor: Edward Robert Perry, Sedona, AZ (US)

(73) Assignee: Kim & Ed Pte Ltd, Singapore (SG)

(*) Notice: Subject to any disclaimer, the term of this patent is extended or adjusted under 35 U.S.C. 154(b) by 0 days.

(21) Appl. No.: 12/203,920

(22) Filed: Sep. 4, 2008

(65) Prior Publication Data
US 2009/0044678 A1 Feb. 19, 2009

Related U.S. Application Data

(63) Continuation-in-part of application No. 10/081,465, filed on Feb. 22, 2002, now abandoned.

(51) Int. Cl.
*B24B 1/04* (2006.01)
(52) U.S. Cl. .......................................... 125/15; 125/18
(58) Field of Classification Search ............. 125/13.01, 125/15, 16.01, 18, 22
See application file for complete search history.

(56) References Cited

U.S. PATENT DOCUMENTS

| 3,628,292 | A |   | 12/1971 | Rue |         |
|-----------|---|---|---------|-----|---------|
| 4,860,721 | A | * | 8/1989  | Matsuda | 125/15 |
| 5,316,416 | A |   | 5/1994  | Kim |         |
| 5,667,423 | A | * | 9/1997  | Itoi | 451/5 |
| 6,273,082 | B1 | * | 8/2001 | Tselesin | 125/15 |
| 6,561,177 | B2 | * | 5/2003 | Ball | 125/13.01 |
| 6,641,381 | B2 | * | 11/2003 | Ball | 125/13.01 |

OTHER PUBLICATIONS

NN 75012448, "Electroformed Multiple Bladed Diamond Saw", IBM Technical Disclosure Bulletin, Jan. 1, 1975, US, vol. 17, Iss. 8, pp. 2448-2449.*
Gideon Levinson, Considerations For MLP/QFN Substrate Singulation, Kulicke & Sofa, Haifa, Israel.
Ramon J. Albalak, "Package Singulation Processes", Advanced Dicing Technologies, in Information Communication Technology, GDS Publishing, 2008.

* cited by examiner

*Primary Examiner*—Maurina Rachuba
(74) *Attorney, Agent, or Firm*—Lawrence Y D Ho & Associates Pte. Ltd.

(57) ABSTRACT

The present invention describes electroformed thin-wall nickel cutting saws or blades that are impregnated with diamond abrasives. The thin-wall saws are formed with a plurality of raised portions and an equal plurality of recessed portions, with each raised portion alternating with a recessed portion, the raised and recessed portions are substantially parallel and are connected by transition portions. In another embodiment, some of the transition regions are formed with intermediate steps or partially raised and recessed portions. These intermediate steps or partially recessed and raised portions allow more uniform distribution of matrix material across a kerf width D1 as the cutting saw is spun, thereby, giving the cut edge a substantially square profile.

11 Claims, 6 Drawing Sheets

ELECTROFORMED THIN-WALL CUTTING SAW IMPREGNATED WITH ABRASIVES

RELATED APPLICATIONS

The present invention is a continuation-in-part of, and claims priority to, U.S. patent application Ser. No. 10/081,465 filed on Feb. 22, 2002, the disclosure of which is herein incorporated in its entirety. A co-pending patent application relating to electroformed thin-wall core drills is also filed on the same day.

FIELD OF INVENTION

The present invention relates to electroformed thin-wall cutting saw or blades that are impregnated with abrasives. In particular, it relates to cutting saws made of thin-wall corrugated electroformed nickel which are impregnated with diamond particles to allow fast, clean and dry cutting. An advantage is in the use as a singulation saw for modern semiconductor or microelectronic packages. They are also useful in cutting small and large objects with or without coolant.

BACKGROUND

Saw blades for cutting semiconductor packages are well known. Such saw blades are made in the form of circular disc, gang saws and band saws. Circular saws may be made by bonding abrasives in a binder (to form so called solid resinoid blades) or by coating abrasives on a support disc (to form so called sintered blades). The outer periphery may be continuous or discontinuous. One of the purposes of providing discontinuities on the outer periphery cutting edge, in the form of slots, is to allow free passage for the outflow of particles abraded from the workpiece and associated coolant. The coolant is used to cool the saw blade as well as to flush particles or debris out of the blade.

These saws are employed in the semiconductor industry to separate individual packages one from another by cutting streets or separation channels into the packaging material. Typical diamond bonded saw blades have been made with a large range of thicknesses, for example, from about 25 microns up to about 500 microns.

Each separated package is then connected to a substrate. Numerous types of substrates are used that fall into a category of Surface Mounted Technology (or SMT) devices. A SMT packaged device may comprise a die mounted on a copper leadframe and encapsulated by a polymer molding with silica fillers. In addition, each SMT package has circuits on or interleaved therein with the circuits having metal laminates, test circuits, ground plane, etc. Each semiconductor package is therefore a composite of materials with different hardness, ductility and abrasiveness.

Some semiconductor packages are singulated using thick saw blades because of requirements for thicker or wider streets. Even these thick saw blades are also destroyed by the filler materials in the packages. They also clogged up rapidly with plastic and metals from the circuits. The clogged up blade then requires more force to make a cut, and cuts at a much slower rate because the diamonds that do the cutting are ineffective; in addition, there is often little room for the newly cut debris to be removed. The newly cut debris abrades the blade material causing excessive wear.

Saw blades of the solid type have a tendency to form a bullet-shaped profile edge after some use. This causes them to be rejected by the microelectronics industry because as the sides of the blades wore and the bottom of the blade becomes smaller and the semiconductor packages being cut grow directly with this wear. In consequence, the packages become wider and out of its dimensional specification. This means that the saw blades must be replaced relatively early before the blades are completely worn.

When clogged, these blades also have a tendency to make rough cuts which can smear or destroy the exposed circuit pattern, especially when the smear occurs at a conductive pad or bump on a substrate, in some cases, ripping them out altogether; these might cause electrical leakage between them. In addition, rough cut edges also tend to have burrs.

Figure 1A:
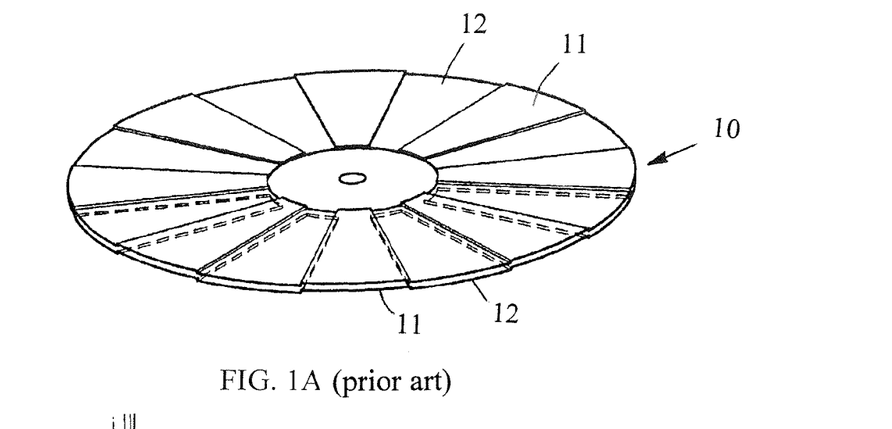
FIG. 1A illustrates a known cutting wheel.
Figure 1B:
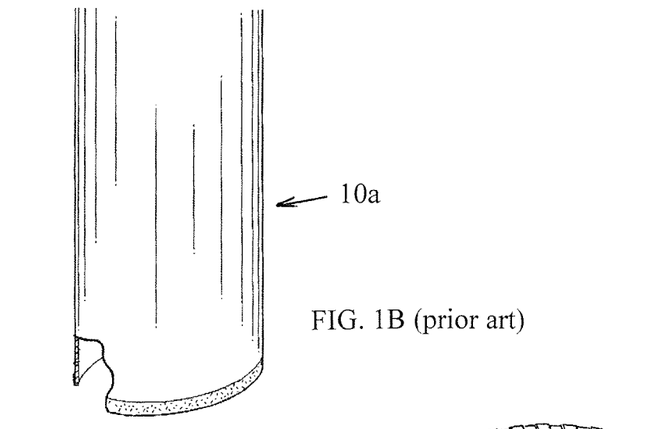
FIG. 1B illustrates a known core drill.

FIG. 1A shows a known cutting wheel 10. The wheel 10, as described in U.S. Pat. No. 3,628,292, has raised bosses 11 on one side, with each boss being formed exactly opposite a groove 12 on the other side. The area of the cutting bosses 11 is made equal to area of the grooves 12 and the effective thickness of the wheel 10 is maintained the same. The wheel 10 employs a resinoid binder of a mixture of ingredients using layers of mesh and grains of hard carbides. Similarly, FIG. 1B shows a known core drill 10a made with a ring of binder and abrasive particles.

With the push for increasing microelectronics processing and maintaining economic throughput, there is a need to increase microelectronics singulating speeds yet giving each packaged device clean cut edges. A clean cut edge or surface has minimal edge chipping, inter-layer chipping, metal burrs and metal smearing. Despite development in thin-wall abrasive impregnated saws, there is a need for a new higher performance saw.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

In one embodiment, the present invention provides an electroformed thin-wall cutting saw that is impregnated with abrasives. The electroformed cutting saw comprises: a thin-wall corrugated nickel electroform having a plurality of raised portions and an equal plurality of recessed portions, with each raised portion alternating with a recessed portion, the raised and recessed portions are substantially parallel and are connected by transition portions so that a top surface of the raised and an opposite surface of the recessed portions define a continuous cutting edge with a kerf width D1, matrix thickness T and relief depth D2; and abrasive particles are impregnated in the thin-wall corrugated nickel electroform.

In another embodiment of the abrasive impregnated cutting saw, some of the transition portions connecting two adjacent raised and recessed portions are further formed with intermediate steps or partially raised/recessed portions, which are parallel to the raised or recessed portion, the distance D3 between opposite surfaces of said intermediate steps or said partially raised/recessed steps is less than the kerf width D1. The saw may be formed with circular, annular or straight cutting edge.

In one embodiment of the circular or annular abrasive impregnated cutting saw has an annular clamping zone, the recessed portions in the clamping zone having notches such that the notches are level with the raised portions and they describe one or more concentric circles.

BRIEF DESCRIPTION OF THE DRAWINGS

This invention will be described by way of non-limiting embodiments of the present invention, with reference to the accompanying drawings, in which.

DETAILED DESCRIPTION

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

Figure 2:
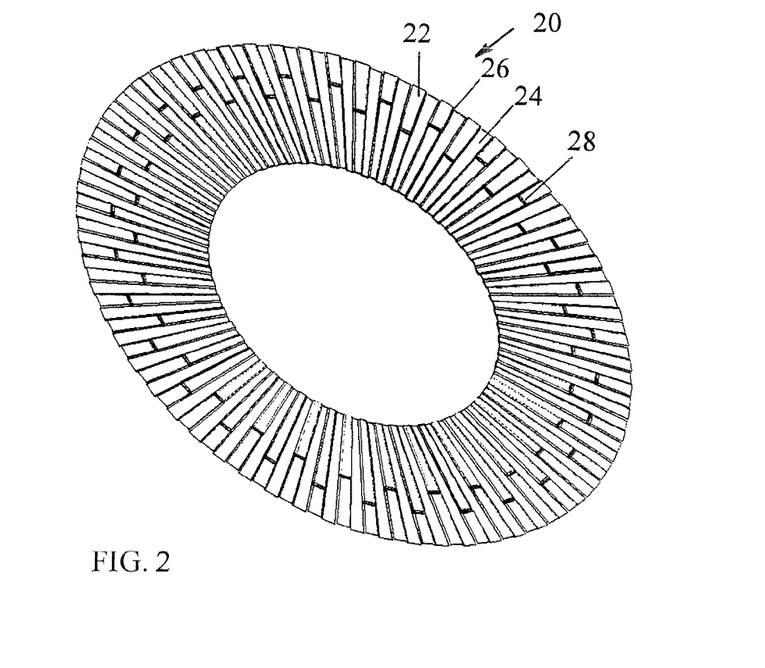
FIG. 2 illustrates a cutting blade according to an embodiment of the present invention.

FIG. 2 shows an electroformed abrasive impregnated cutting blade 20 made according to an embodiment of the present invention. As shown in FIG. 2, the cutting blade 20 is made by electroforming nickel matrix on a mandrel in a bath containing suspended diamond particles. A surface of the mandrel has corrugations such that the cutting blade 20 is formed with alternating raised portions 22 and recessed portions 24. A cutting zone is located along an outer periphery of the cutting blade 20, whilst a clamping zone is located in an annular region between the outer periphery and an inner periphery. Transition portions 26 of the cutting blade 20 join and separate the raised portions 22 from the recessed portions 24 such that the raised portions 22 and the recessed portions 24 are spaced apart laterally and longitudinally. The raised portions 22 and the recessed portions 24 are substantially flat and are each in planes that are substantially parallel. By adopting a corrugated shape, the cutting blade 20 is strong and rigid in its planar cutting direction. Also, the corrugated shape assists in removal of waste material during cutting by generating airflow around the cutting blade 20. The generated airflow further assists in cooling of the cutting blade 20 during cutting.

In the cutting blade 20, each transition portion 26 has an inclination relative to the raised portion and recessed portion of about 45 degrees. The inclination of the transition portion 26 can vary depending on the intended use of the blade 20 and on the material to be cut. The inclination can be less than 90 degrees, less than 60 degrees and more preferably in the range of about 30 degrees to about 60 degrees depending on the desired use of the blade. For example, in the microelectronics singulation industry, the preferred inclination of the transition portion 26 is about 45±15 degrees.

Inclination of the transition portion 26 is also important to make the blade 20 flexible and self-aligning when clamped by a hub or fixture on an arbor of a singulation machine. Inclination of the transition portions 26 can vary inside the clamping zone. By varying the number of raised portions 22 and recessed portions 24 other properties of the blade 20, such as flexibility, may be varied.

In another embodiment of the cutting blade 20, the clamping zone is near the inner periphery.

Figure 3:
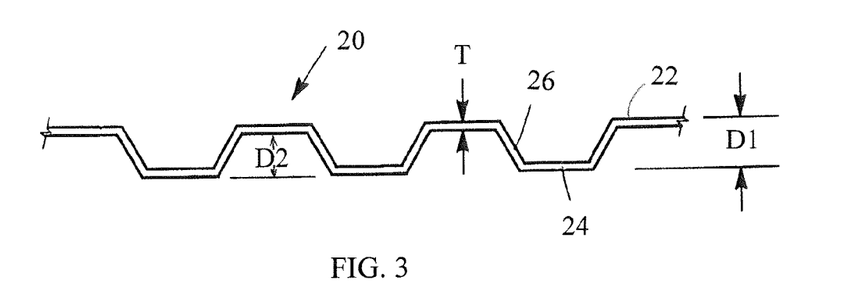
FIG. 3 illustrates a corrugation pattern of the cutting blade shown in FIG. 2.

FIG. 3 shows an edge profile of the corrugated blade 20 shown in FIG. 2. As shown in FIG. 3, the distance between the top surface of the raised portions 22 and the bottom surface of the recessed portions 24 defines a kerf width D1, which is a width of cut on a workpiece by the blade 20. The difference in height between the raised portions 22 and the recessed portions 24 defines a corrugation or relief depth D2, such that D1 equals D2 plus matrix thickness T of the thin-wall cutting blade 20.

For example, in the microelectronics singulation industry, the kerf width D1 ranges from about 25 microns to about 500 microns. The thickness T of the thin-wall blade, i.e. that of portions 22, 24 and 26, is usually about 10% to about 60% of D1, and preferably about one-third of D1. For example, when the portions 22, 24, and 26 are about 50 microns thick each, the blade 20 can have a kerf width D1 of about 200 microns. Blades 20 approximately 50 microns thick have been made with a corrugated surface having 120 raised portions and 120 recessed portions. These blades 20 give a clean-cut edge on a workpiece, and are rigid and self-flattening when clamped on a hub or fixture.

Figure 4A:
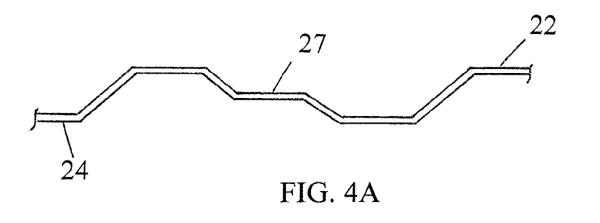
FIG. 4A illustrates an intermediate step in the corrugation pattern shown in FIG. 3.

FIG. 4A shows an edge profile of a cutting blade 20 according to another embodiment of the present invention. By comparing FIG. 4A with FIG. 3, the edge profile shown in FIG. 4A has an intermediate step 27 in some of the transition portion 26 such that the intermediate step 27 is parallel to the raised and recessed portions 22,24.

Figure 4B:
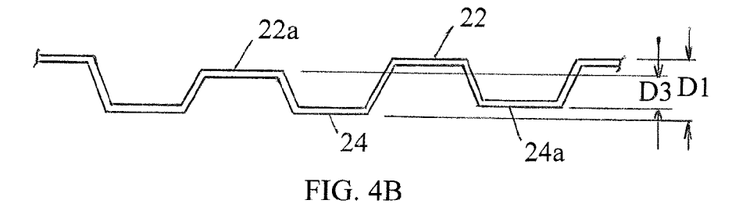
FIG. 4B illustrates partially raised and partially depressed portions in the corrugation pattern shown in FIG. 3.

FIG. 4B shows an edge profile of a cutting blade 20 according to another embodiment of the present invention. The edge profile shown in FIG. 4B has partially raised portion 22a and partially recessed portion 24a such that they define a corrugation depth D3, which is smaller than D1. In one embodiment, the partially raised portions 22a and partially recessed portions 24a are adjacent to each other; in another embodiment, they are spaced laterally apart from each other.

Referring back to FIG. 2, the cutting blade 20 has notches 28 that are located in the clamping zone. The notches 28 form a circle that is concentric with the outer and inner diameters. Each notch 28 is seen to be formed from the rear of a respective recessed portion 24 such that the notches are level with the raised portions. The notches 28 thus bridge the raised portions 22 and minimize deformation of the shape of the corrugations in the clamping zone caused by a clamping flange shown in FIG. 6B or centrifugal forces when a cutting blade 20 is spun, for example, to a speed of 15,000-30,000 RPM. In another embodiment of the cutting blade, the notches 28 form two rows of staggered notches 28, as can be seen in FIGS. 2 and 4C.

Figure 4C:
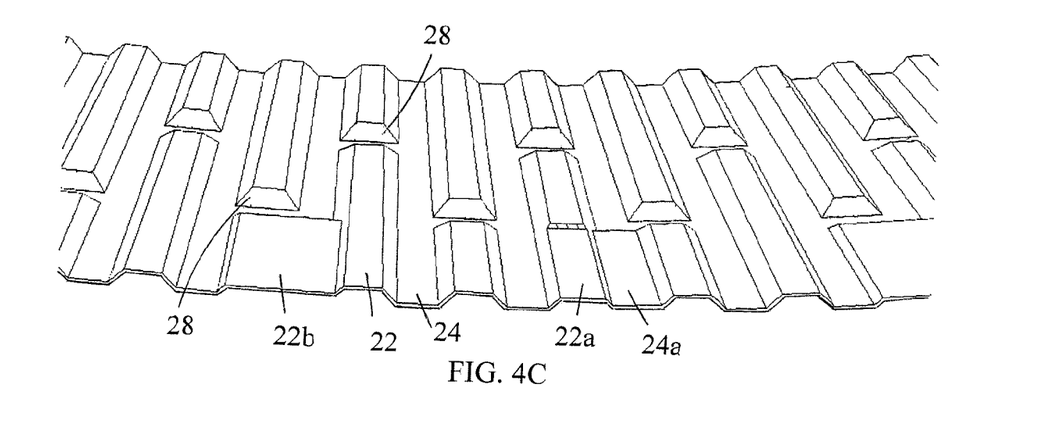
FIG. 4C illustrates two concentric rows of notches and associated partially raised/depressed portions or intermediate steps.

FIG. 4C shows an edge profile of a cutting blade 20 according to yet another embodiment of the present invention. As shown in FIG. 4C, some of the intermediate steps 27 are formed as partially raised portion 22a or partially recessed portions 24a in the cutting zone of the blade 20. This is permitted by the presence of the notches 28. Also as shown in FIG. 4C, some of the intermediate steps 22b are formed with areas larger than that of the raised or recessed portions 22, 24.

During or after use, wear and tear of the transition portions 26 is exhibited by a partial concave profile of the cutting edge. This is in contrast to a bullet-shaped cutting profile of the prior art cutting blades. The concave profile of the cutting edge of the present cutting blade is due to the difference in the volumes of matrix material in contact with the workpiece across the kerf width D1 as the cutting blade 20 is spun. By forming intermediate steps 27, partially raised portions 22a, 22b or partially recessed portions 24a, concentrations of matrix materials across the kerf width D1 are made more uniform and this gives the cutting blade 20 a substantially square cutting edge profile.

Figure 5A:
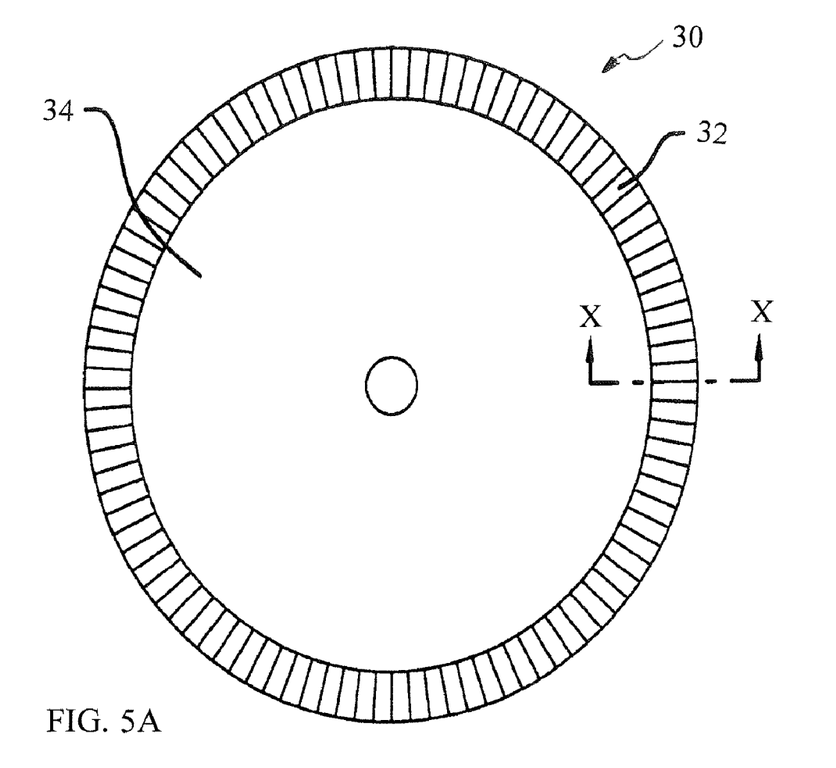
FIG. 5A illustrates an annular saw blade formed according to another embodiment of the present invention.

FIG. 5A shows a plan view of a relatively large annular saw 30 made according to the present invention. The saw 30 comprises a thick metal blank or support 34 to which is attached a blade 32 formed in the shape of a ring. The blade 32 is corrugated as shown in FIG. 3 or 4A-4C. Such blades 32 are easily fabricated in diameters of 1 m or more and the saws 30 are operable to cut material smoothly and without clogging.

Figure 5B:
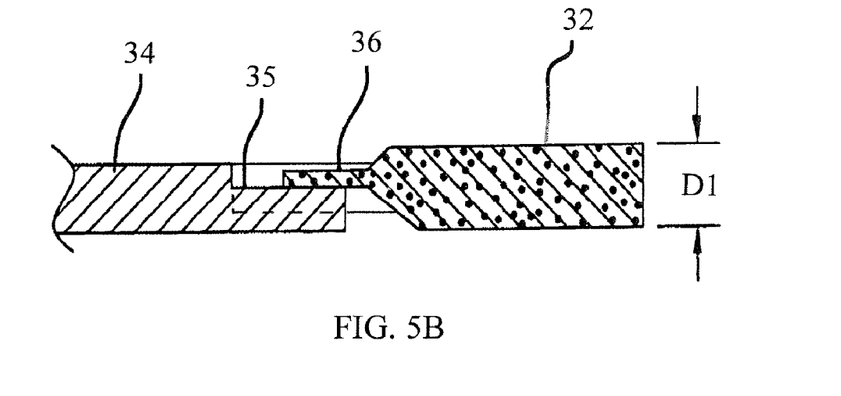
FIG. 5B illustrates a cross-section of a corrugated connection between the annular saw blade and a support disc.

FIG. 5B shows an enlarged section in elevation taken at line X-X of FIG. 5A. The disc shaped support 34 is provided with a corrugated ring-shaped shoulder 35. The shoulder surface 35 is formed with a corrugation pattern that matches that of a mounting flange 36 of the blade 32. The corrugations of the shoulder surface and mounting flange 36 are of the same pitch as that of the blade 32 but of different corrugation depth. The mounting flange 36 may be attached to the shoulder 35 by numerous known techniques.

Figure 6A:
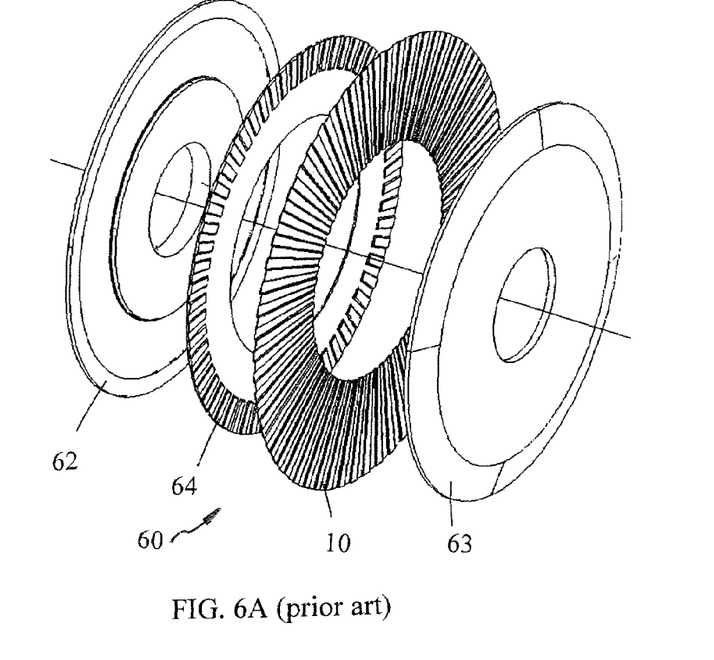
FIG. 6A illustrates an exploded view of a hub for holding and mounting a known cutting blade.
Figure 6B:
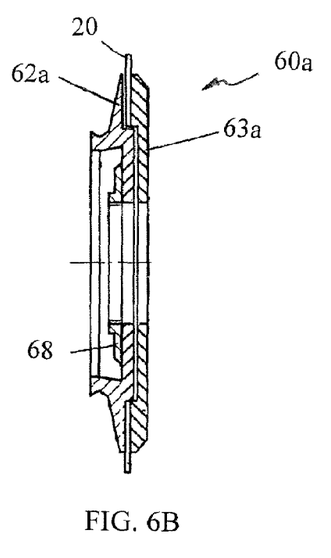
FIG. 6B illustrates a section view of another hub for holding and mounting the cutting blade of the present invention.

FIG. 6A shows an exploded view of a hub 60 used for holding and mounting a prior art cutting blade 10. The hub 60 is made up of three parts, a flanged hub 62, a support hub 63 and an insert 64. FIG. 6B shows a hub 60a for holding and mounting the cutting blade 20,30 of the present invention. As shown in FIG. 6B, the hub 60a is also made up of a flanged hub 62a and a support hub 63a. The flanged hub 62a and support hub 63a are mounted on an arbor of a singulation machine. The flanged hub 62a and support hub 63a sandwich the cutting blade 20,30 and, in turn, are held in an assembly on the arbor by a clamp nut 68 on one side and a spacer or collar on the opposite side. With the notches 28 formed in the clamping zone of each blade 20,30, the insert 64 is no longer required to hold or mount the blade 20,30 on an existing singulation machine.

Figure 7A:
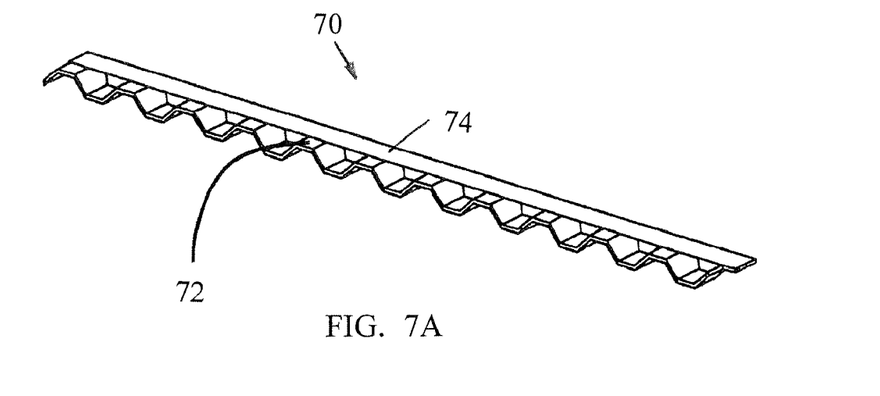
FIG. 7A illustrates part of a band saw according to another embodiment of the present invention.

FIG. 7A shows part of a band saw 70a according to another embodiment of the present invention. As shown in FIG. 7A, the band saw 70a is made by electroforming a corrugated cutting edge 72a according to the present invention and an integral elongate strip 74.

Figure 7B:
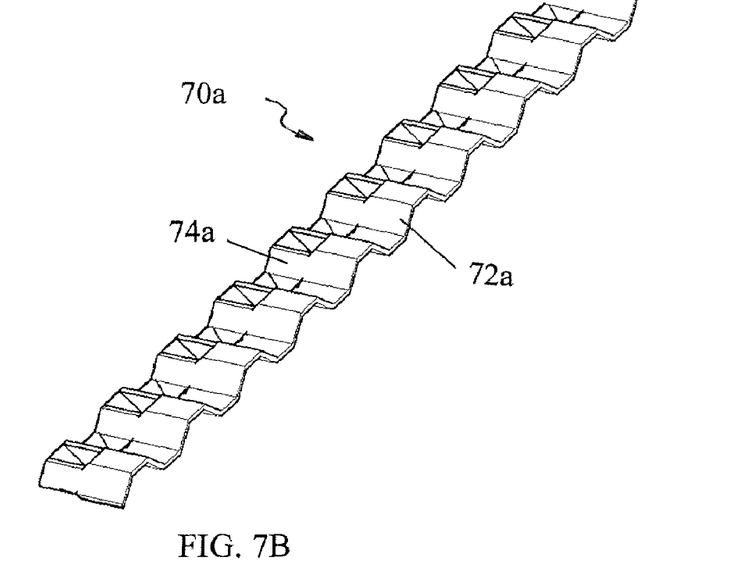
FIG. 7B illustrates part of another band saw of the present invention.
Figure 7C:
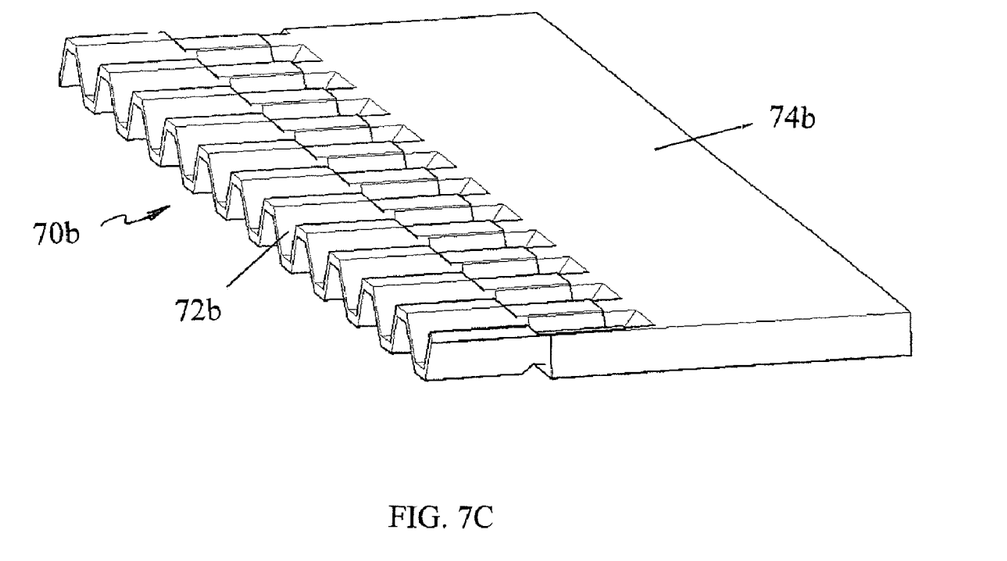
FIG. 7C illustrates part of yet another band saw of the present invention.

FIG. 7B shows part of a band saw 70b according to another embodiment of the present invention. As shown in FIG. 7B, the band saw 70b is also made by electroforming a corrugated cutting edge 72b and an integral but corrugated strip 74a. In another embodiment, as shown in FIG. 7C, the corrugated cutting edge 72b is connected to the elongate strip 74b by a corrugated section. In yet another embodiment (not shown), the corrugated cutting edge 72,72a,72b has partially formed raised and recessed portions like those shown in FIG. 4C.

Figure 8A:
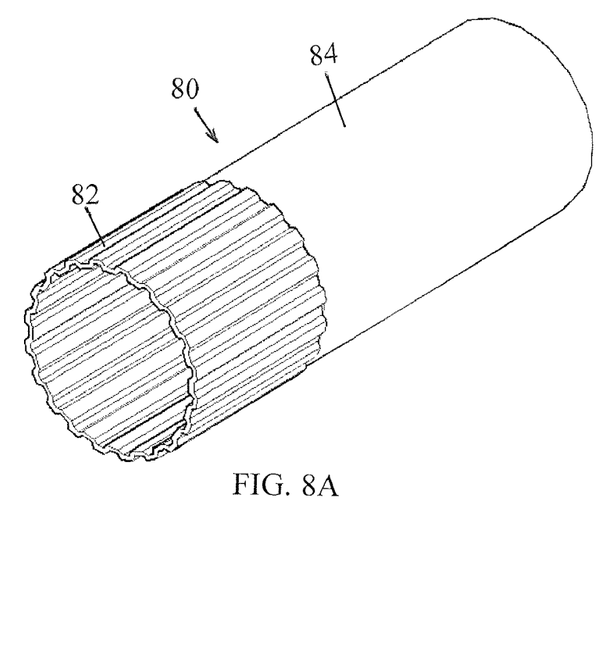
FIG. 8A illustrates a core drill according to yet another embodiment of the present invention.
Figure 8B:
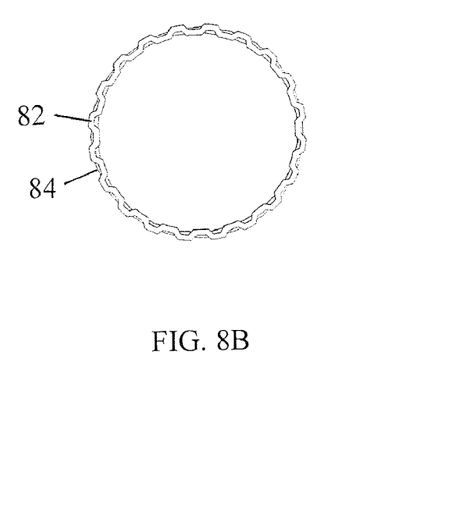
FIG. 8B illustrates an end view of the core drill shown in FIG. 8A.

FIG. 8A shows a core drill 80 according to another embodiment of the present invention. FIG. 8B shows an end view of the core drill; The core drill 80 is made up of a corrugated coring portion 82 formed in a cylindrical shape, which is integral with a pipe portion 84. In one embodiment, the thickness of the blade T is about half the kerf width D1. The core drill 80 allows for less material to be removed and therefore uses less energy to bore a hole or core a rod. The core-drill 80 has been tested for cutting lasing rods from an ingot to near finished sizes. The test results show superior surface finish and tolerances of the lasing rod such that final sizing process time is reduced. In the conventional process, an oversized rod is cored out and excess rod material containing micro-cracks are ground off to final size before polishing; the ends of the rods are polished and coated with optical coatings to form partial mirrors and full mirrors for a laser to work. With the core drill 80 of the present invention, a conventional processing of 4 days for making a lasing rod from an ingot have been cut down to about ten minutes. Besides, there is a lot of savings in the raw material as waste material is minimized. Further, due to the slight concave cutting edge across the kerf width, no chipping at the entrance and exit of the drill allow a manufacturer to cut an entire core material to final size. Further more, the core drill 80 allows higher drill feed speed of about 10 mm/min without coolant to about 130 mm/min with coolant on hard and brittle materials. It is estimated that a laser rod manufacturer may save about US $10 million a year or more by using the core drills of the present invention.

The pipe or chucking portion 84 shown in FIG. 8A has cylindrical surfaces. In another embodiment, the chucking portion 84 has the same corrugation pattern as the coring portion 82 and engages with splines on a spindle of an external drilling machine. In yet another embodiment, the chucking portion 84 has the same corrugation pattern as the coring portion 82 but notches 28a are formed on the outer surface and/or inner surface. Preferably, the notches 28a are staggered to form two or more rows. The rows of notches 28a may be concentric or spiral. With the notches 28a, a conventional chuck of known drilling machine may be used with the core drill of the present invention.

Saw blades 20,30 and core drills 80 made according to the present invention were tested. In the tests, linear cutting speeds of 350 mm per second were performed. These tests gave cutter lives of between 25 and 50 km. Comparing with the prior art cutter performance of 50 mm per second and 500 mm of cutting life, the saw blade 20,30 and core drill 80 of the present invention last about 50 to about 100 times longer than prior art blades/drills.

While specific embodiments have been described and illustrated, it is understood that many changes, modifications, variations and combinations thereof could be made to the present invention without departing from the scope of the invention. For example, the transition portions formed with intermediate steps or partially raised/recessed portions have been described for the circular or annular saws but are not so restricted for the core drills. Besides, other abrasive particles, such as carbide, cubic boron nitride, corundum, and so, may be used instead of diamond according to the hardness of the workpiece to be cut.

What is claimed is:

1. An abrasive impregnated cutting saw comprising:
   a thin-wall corrugated nickel electroform having a plurality of raised portions and an equal plurality of recessed portions, with each raised portion alternating with a recessed portion, the raised and recessed portions are substantially parallel and are connected by transition portions so that a top surface of the raised and an opposite surface of the recessed portions define a continuous cutting edge with a kerf width D1, matrix thickness T and relief depth D2; and abrasive particles are impregnated in the thin-wall corrugated nickel electroform;

wherein said saw is formed with a circular, annular or straight cutting edge, each said saw has a clamping or driving zone and said clamping/driving zone has notches that bridge at least the raised portions.

2. An abrasive impregnated cutting saw according to claim 1, wherein some of the transition portions connecting two adjacent raised and recessed portions are further formed into one or more intermediate steps that are parallel to the raised or recessed portion.

3. An abrasive impregnated cutting saw according to claim 1, wherein some of the raised and recessed portions are formed with intermediate steps or partially raised/recessed portions, which are parallel to the raised/recessed portions, the distance D3 between opposite surfaces of said intermediate steps or partially raised/recessed portions is less than the kerf width D1.

4. An abrasive impregnated cutting saw according to claim 1, wherein the circular, annular or straight saw has flat raised and recessed portions.

5. An abrasive impregnated cutting saw according to claim 1, wherein the circular, annular or straight saw are operable for singulating microelectronic packages and give a kerf thickness D1 of about 25-300 microns with a corresponding corrugated metal wall thickness of about 5-80 microns.

6. An abrasive impregnated cutting saw according to claim 5, wherein the abrasive particles are diamond and the cutting saw allows a dry linear feed speed of about 350 mm per second.

7. An abrasive impregnated cutting saw according to claim 6, wherein the saw's cutting life exceeds 25 km.

8. An abrasive impregnated cutting saw according to claim 1, wherein said notches in the recessed portions in the clamping/driving zone are formed level with the raised portions and said notches describe a concentric circle or a line.

9. An abrasive impregnated cutting saw according to claim 8, wherein adjacent notches are staggered to form two or more concentric circles or two or more parallel lines.

10. An abrasive impregnated cutting saw according to claim 1, wherein the annular saw is supported on a metal blank.

11. An abrasive impregnated cutting saw according to claim 1 wherein the straight saw forms a band saw.

* * * * *